United States Patent [19]
O'Callaghan

[11] Patent Number: 5,820,463
[45] Date of Patent: Oct. 13, 1998

[54] METHOD AND APPARATUS FOR MULTI-PLAYER GAMING OVER A NETWORK

[75] Inventor: Daniel O'Callaghan, Fairfax Station, Va.

[73] Assignee: Bell Atlantic Network Services, Inc., Arlington, Va.

[21] Appl. No.: 595,883

[22] Filed: Feb. 6, 1996

[51] Int. Cl.⁶ .................................................. A63F 9/24
[52] U.S. Cl. ............................ 463/42; 463/41; 455/5.1; 348/13
[58] Field of Search .................................. 463/30, 31, 1, 463/40, 41, 42; 379/90–93, 96, 102; 455/2, 3.1, 4.1, 4.2, 5.1, 6.1, 6.2, 6.3; 348/6, 12, 13

[56] References Cited

U.S. PATENT DOCUMENTS

| | | |
|---|---|---|
| 4,521,014 | 6/1985 | Sitrick . |
| 4,572,509 | 2/1986 | Sitrick . |
| 4,964,638 | 10/1990 | Ishida ........................................ 463/42 |
| 5,083,271 | 1/1992 | Thacher et al. ............................ 463/42 |
| 5,292,125 | 3/1994 | Hochstein et al. ........................ 463/41 |
| 5,350,176 | 9/1994 | Hochstein et al. ........................ 463/42 |
| 5,410,343 | 4/1995 | Coddington et al. ....................... 348/7 |
| 5,538,255 | 7/1996 | Barker ....................................... 463/41 |
| 5,586,257 | 12/1996 | Perlman .................................... 463/42 |

*Primary Examiner*—Jessica Harrison
*Assistant Examiner*—Mark A. Sager
*Attorney, Agent, or Firm*—Lowe, Price, LeBlanc & Becker

[57] ABSTRACT

Multiple player games implemented by computer are improved to permit playing without any delay penalty for stations remote from another station. Delay times are compensated using measurement of round trip delay times to each station and the stations participating in the game determine the proper master station based on shared information.

17 Claims, 13 Drawing Sheets

|  | P1 | P2 | P3 | P4 |
|---|---|---|---|---|
| LOS ANGELES P1 | 0 | .10 | .18 | .25 |
| SALT LAKE CITY P2 | .10 | 0 | .12 | .21 |
| LUBBOCK P3 | .18 | .12 | 0 | .19 |
| ALEXANDRIA P4 | .25 | .21 | .19 | 0 |

MATRIX Sij
Figure 6

$d$ = (.18, .12, 0, .19) = STATION TO MASTER DELAY VECTOR

Figure 10A $P_{ij}$ = $d_i + d_j$

|    | P1  | P2  | P3  | P4  |
|----|-----|-----|-----|-----|
| P1 | .36 | .30 | .18 | .37 |
| P2 | .30 | .24 | .12 | .31 |
| P3 | .18 | .12 | 0   | .19 |
| P4 | .37 | .31 | .19 | .38 |

= TOTAL PATH DELAYS INCOMING ON PATH *i* AND OUTGOING ON PATH *j*

Figure 10B $$\Delta ij \;=\; K\, I_{ig} - P_{ij}$$

|    | P1  | P2  | P3  | P4  |
|----|-----|-----|-----|-----|
| P1 | .02 | .08 | .20 | .01 |
| P2 | .07 | .14 | .26 | .09 |
| P3 | .20 | .26 | .38 | .19 |
| P4 | .01 | .07 | .19 | 0   |

= DELAY ADDED BY THE MASTER TO EQUALIZE THE GAME

Figure 10C

| FROM | TIME FOR SENDING | DESTINATION | COMMAND |
|---|---|---|---|
| P1 | 6/25 10:03 3511 | P4 | FIRE! |
| P4 | 3520 | P4 | I'M DESTROYED |
| P1 | 3521 | P1 | FIRE! |
| P4 | 3530 | P1 | I'M DESTROYED |
| P1 | 3581 | P2 | FIRE! |
| P4 | 3590 | P2 | I'M DESTROYED |
| P3 | 3691 | P4 | FIRE! |
| P1 | 3701 | P3 | FIRE! |
| P3 | 3708 | P1 | FIRE! |
| P4 | 3710 | P3 | I'M DESTROYED |
| P3 | 3768 | P2 | FIRE! |
| | ... | ... | ... |

OUTPUT QUEUE
Figure 11

METHOD AND APPARATUS FOR MULTI-PLAYER GAMING OVER A NETWORK

TECHNICAL FIELD

The invention relates generally to the field of computer games and more particularly to computer games with multiple players communicating over a network.

BACKGROUND ART

In recent years, computer games have become very popular. A computer with a display and with one or more input/output devices is loaded with particular application software which manages the interaction between a player and the computer. Typically, such games are directed to themes such as combat or flight simulation in which the user exerts control over a variety of parameters and the result of that control is reflected in changes in the display on the screen. In a combat scenario, a user might be in control of an armored vehicle, such as a tank, and the display would represent a battlefield in which the player attempts to attack and destroy enemy vehicles appearing on the screen. The player typically play against the computer, in the sense that the computer controls the actions of the enemy tanks in returning fire and in motion on the battlefield.

Games of this nature contain the drawback that only one player at a time may participate. If more than one player is to participate, they usually must do so sequentially rather than simultaneously.

Figure 1A:
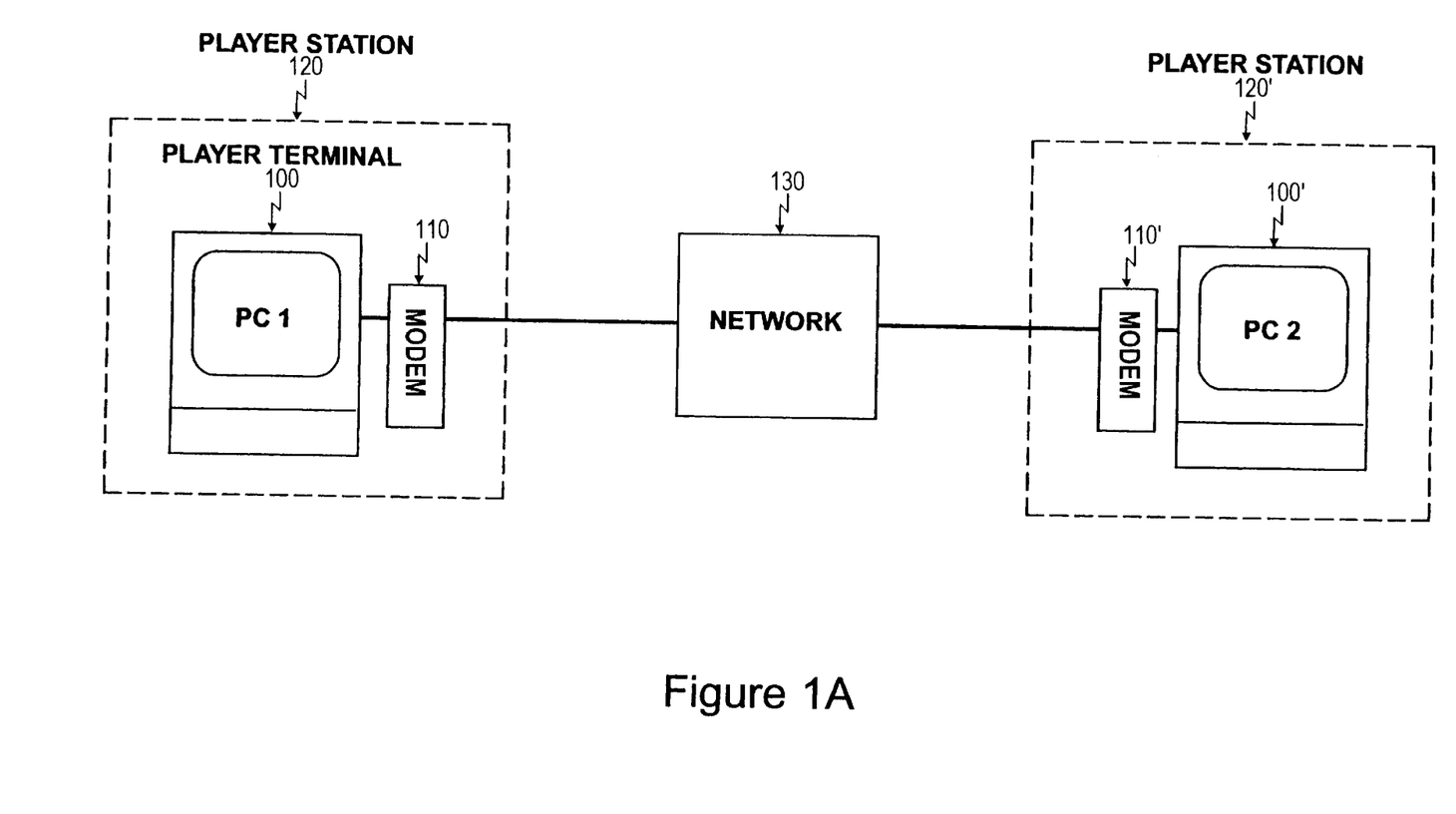
FIG. 1A illustrates prior art gaming arrangements accommodating two player terminals.

Some software has been developed which permits two players to interact in a gaming situation. This is illustrated, for example, in FIG. 1A, in which a player interacts at a player terminal 100 with software which is loaded on a computer, such as a personal computer PC1. Commonly, such computers are equipped with modulator/demodulator units (modems) 110 which permit data generated by application programs to be transmitted to remote locations over a network 130. Network 130 can be any voice, data or integrated network known to the industry. As illustrated in FIG. 1A, a player at player station 120 can interact with a player at player station 120' over the network.

Figure 1B:
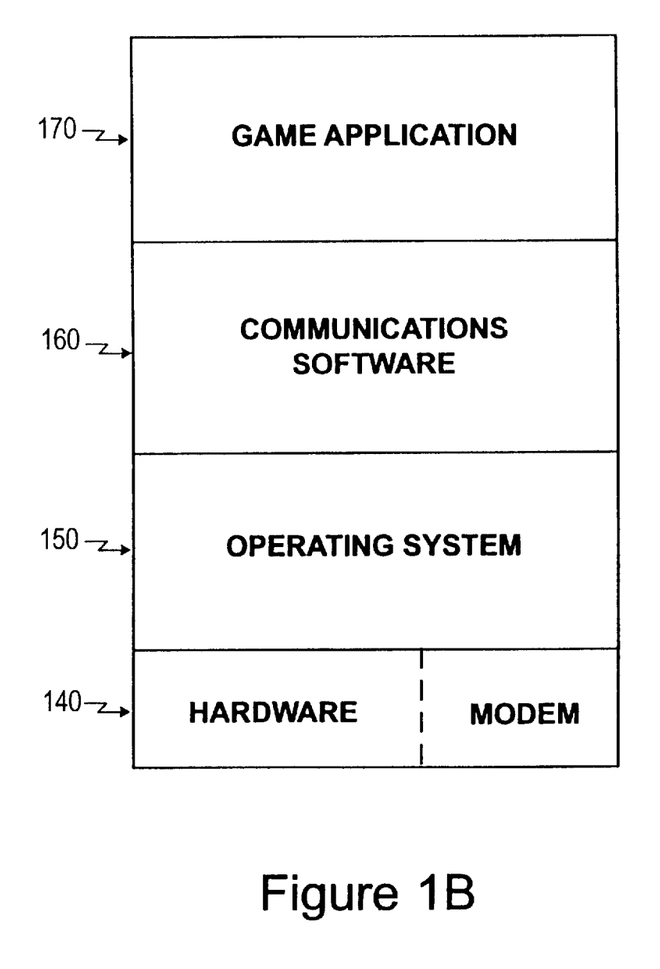
FIG. 1B illustrates at a high level the architecture of each of the terminals.

A typical architecture for a player station is symbolically represented in FIG. 1B. At the lowest level, the computer hardware is represented by layer 140. That hardware typically includes a modem which, as indicated by the dashed line, may be optionally an internal or external modem. Layer 150 represents an operating system which is utilized to control the hardware and to permit convenient user access to common system operations. Layer 160 represents communication software which typically invokes the services of the operating system in communicating to the external world over the modem. In some instances, communication software can be written to directly access the hardware layer, without the use of operating system services. At the highest level, a game application layer 170 represents particular application software to implement any particular game.

A two player game as illustrated in FIG. 1A could be accomplished by one player doing a remote login to the computer of the other player. Software for such remote login, such as Telnet utilized on the Internet system, is readily available. Additionally, most suppliers of communication software design the software with a host mode which accommodates remote login from another computer location. In a two-player game, one station can login remotely to the other station and invoke to the game software. After an initializing exchange of data, the game begins.

There is a problem associated with this configuration. If the player station operating as host is linked to the other player station by a network having substantial delay, the host will execute commands and display the results to the player at the host terminal while commands and other game information (hereinafter collectively commands) are still being sent over the network to the remote player station. If speed or dexterity is required for the game, the player at the host station will have an unfair advantage because the player at the remote station will always appear to have much slower responses due to the time required to transmit the remote players commands over the network. This creates an unfair advantage to the player operating a terminal in the host mode.

Figure 2:
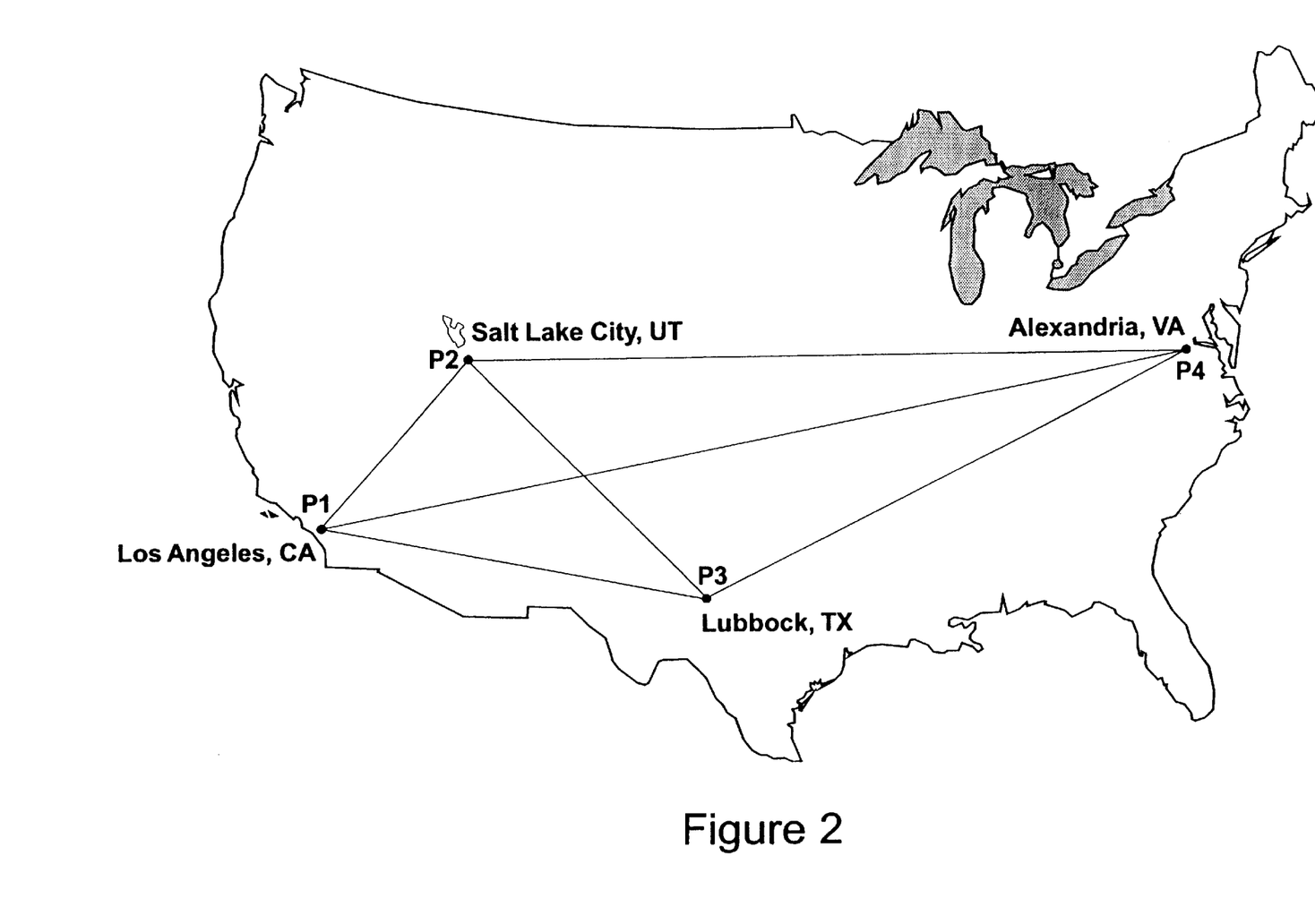
FIG. 2 illustrates a geographical configuration of players and the problems the FIG. 1 architecture would have implementing multi-player gaming.

FIG. 2 illustrates a geographical configuration of players and illustrates some of the problems the FIG. 1 architecture would have in implementing multi-player gaming. Players P1, P2, P3 and P4 are located respectively at Los Angeles, Calif.; Salt Lake City, Utah; Lubbock, Tex. and Alexandria, Va. If one attempts to utilize the architecture as shown in FIG. 1 for such a multi-player game, each player requires three modems to implement the game illustrated. For station P1, one modem dials up Salt Lake City, one dials up Alexandria, Va. and one dials up Lubbock, Tex. However, most personal computer class devices have only one modem, not three. The dial up of each player is not a practical solution. Further, on a national or worldwide scale, network latencies become very significant which means that the players closest to the master station where the game application software is running, are at a disadvantage, particularly if a satellite link is utilized for the connection.

OBJECTS OF THE INVENTION

Against this background, one object of the invention is to permit multi-player games to be played over a network.

Another object of the invention is to permit multi-player games to be played over a network using a single modem.

Another object of the invention is to eliminate the delay penalty for stations which are farther from a master station and to make the game fair to all players.

Another object of the invention is to permit multi-player games over dial up connections.

Additional objects, advantage and novel features of the invention will be set forth in part in the description which follows, and in part will become apparent to those skilled in the art upon examination of the following or may be learned by practice of the invention. The objects and advantages of the invention may be realized and obtained by means of the instrumentalities and combinations particularly pointed out in the appended claims.

DISCLOSURE OF THE INVENTION

The invention is directed to gaming methods and apparatus in which each player is interconnected with plural players over a communications network. The network may be analog or digital and, if digital, the network may preferably be a packet network such a one conforming to X.25 or IEEE standard 802.3 which preferably establishes virtual circuits between players. The players may be either directly connected to the network or may access the network via a dial up link.

The round trip delay times between a pair of players is measured by sending a timing signal such as a packet from the one player to the other and echoing the signal back to the station of origin. The difference in time between the time the timing signal is sent and the echoed version of that signal is returned from the other player to the station of origin is the round trip delay time.

The measured round trip delay times are arranged into a matrix Mij where each cell Mij contains the measured delay between players Pi and Pj. In some network architectures, it may be desirable to make plural round trip delay measurements between players and to calculate a mean value for use in the matrix.

If a virtual circuit is used to link two players, the delays will be fairly stable and one measurement may be sufficient. If however, a connectionless service is used, delays may vary widely depending upon the route selected between players. In such a case, one may make several measurements and calculate an average which will be used for the round trip delay entry in the matrix.

In setting up a virtual circuit, the delays will normally be symmetrical, that is the delay from player Pi to player Pj will be the same as the delay from player Pj to player Pi. In such a case the matrix is symmetrical and all necessary information is available in either the upper or lower triangular sub-matrix of the matrix.

To determine which player will serve as a master station based on the round trip delay times, the delay values of, for example, the upper triangular matrix are averaged and the average value of the entries calculated. The player Pj associated with the column j containing the delay value which most nearly equals the average value is selected as the master station for the game.

After the master station is determined, the game commences and all game commands or information are sent from the individual players to the master station. The master station transmits the commands or information to each player with an individualized delay calculated to ensure that commands sent to the players arrive substantially simultaneously. That delay is inversely proportional to the amount of measured delay between the master station and the player to which the command is sent. During the game, each player receives commands only from the master station for execution by the game software.

The invention is also directed to a method of operating a communication network to permit gaming by a plurality of players connected to the network by designating a player to act as a master station based on measured round trip communication delay times, by routing all game commands through the master station for transmission to all players and by equalizing the delays imparted to game commands or information received at the master station so that each command will be received at all player locations substantially simultaneously.

BRIEF DESCRIPTION OF DRAWINGS

FIG. 10 illustrates the ordering of typical output data such as might be found in output queue 910 of FIG. 9.

DETAILED DISCLOSURE OF THE INVENTION

Figure 3:
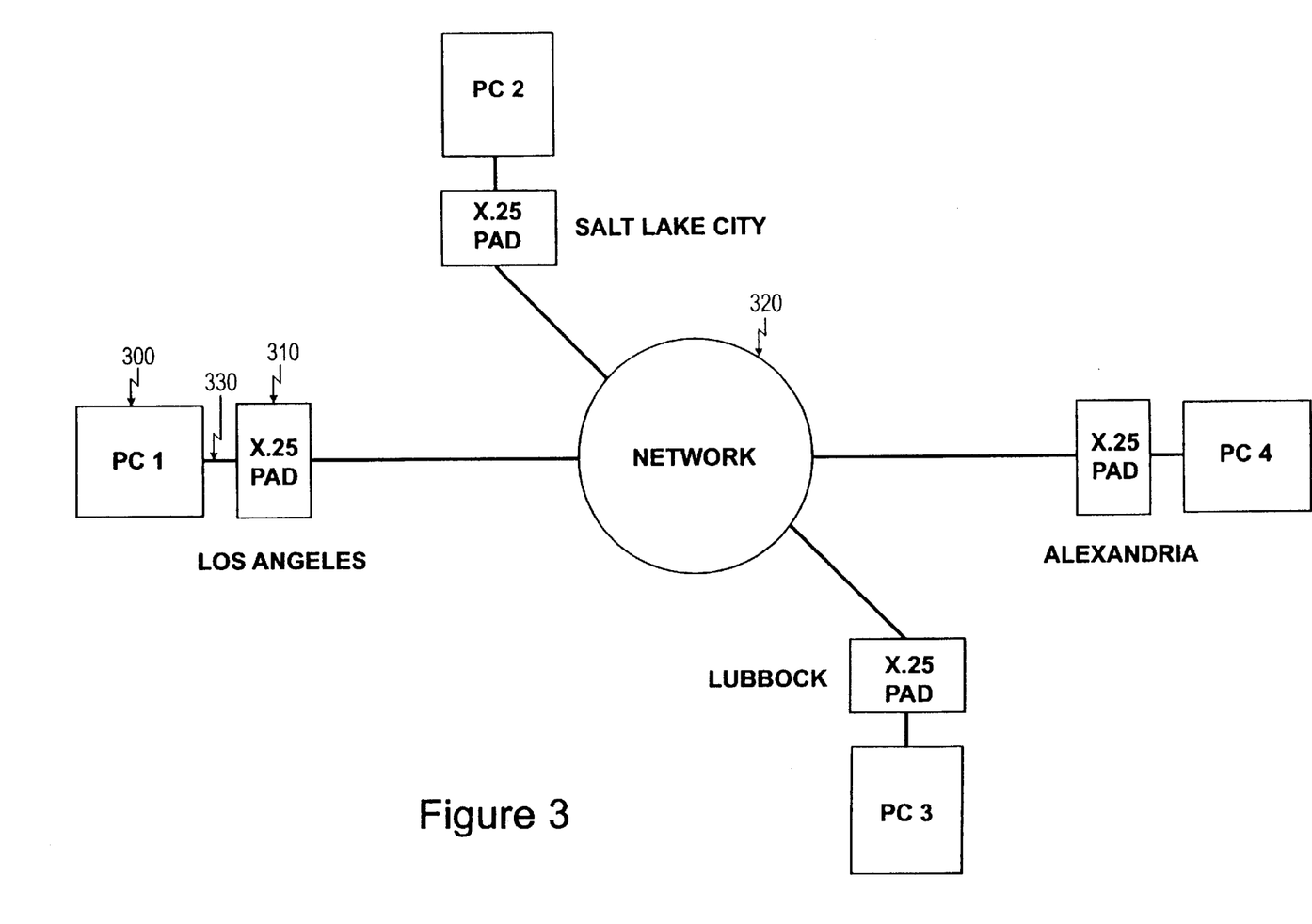
FIG. 3 illustrates a network configuration according to one embodiment of the invention.

FIG. 3 illustrates the preferred network architecture for carrying out the invention. The same four stations as illustrated in FIG. 2 are assumed, namely one station in Los Angeles, one in Salt Lake City, one in Lubbock and one in Alexandria. Each player terminal PC1 through PC4, designated 300, is connected to an X.25 packet assembler and disassembler (PAD) 310 where data from the player terminal are assembled into X.25 format for transmission over X.25 network 320 to the other stations. The connection between player terminal 300 and X.25 PAD 310 occurs over link 330 which may be either a dial up link utilizing modems or a direct digital link between a communications board in the player terminal and the PAD 310.

Figure 4:
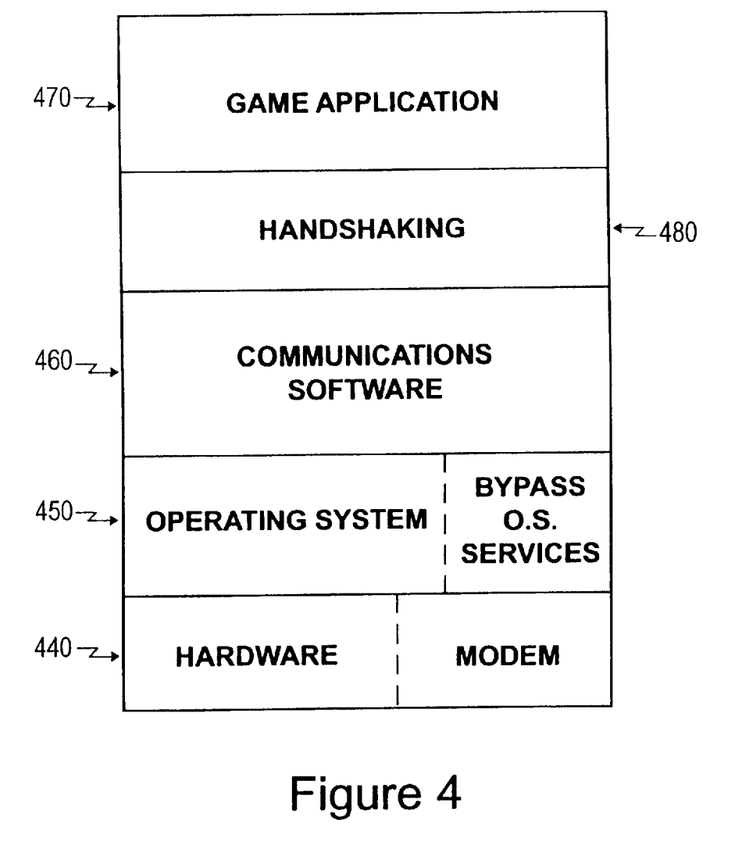
FIG. 4 illustrates a high level software architecture of a player terminal shown in FIG. 3.

The architecture of player terminal 300 is illustrated in FIG. 4. This architecture is very similar to that shown in FIG. 1B; and corresponding numbers in the last two digits identify corresponding layers. However, layer 480 having no counterpart in FIG. 1B, represents certain actions, sequences and processes desirable in carrying out the invention which are collectively identified by the label "handshaking."

Figure 5:
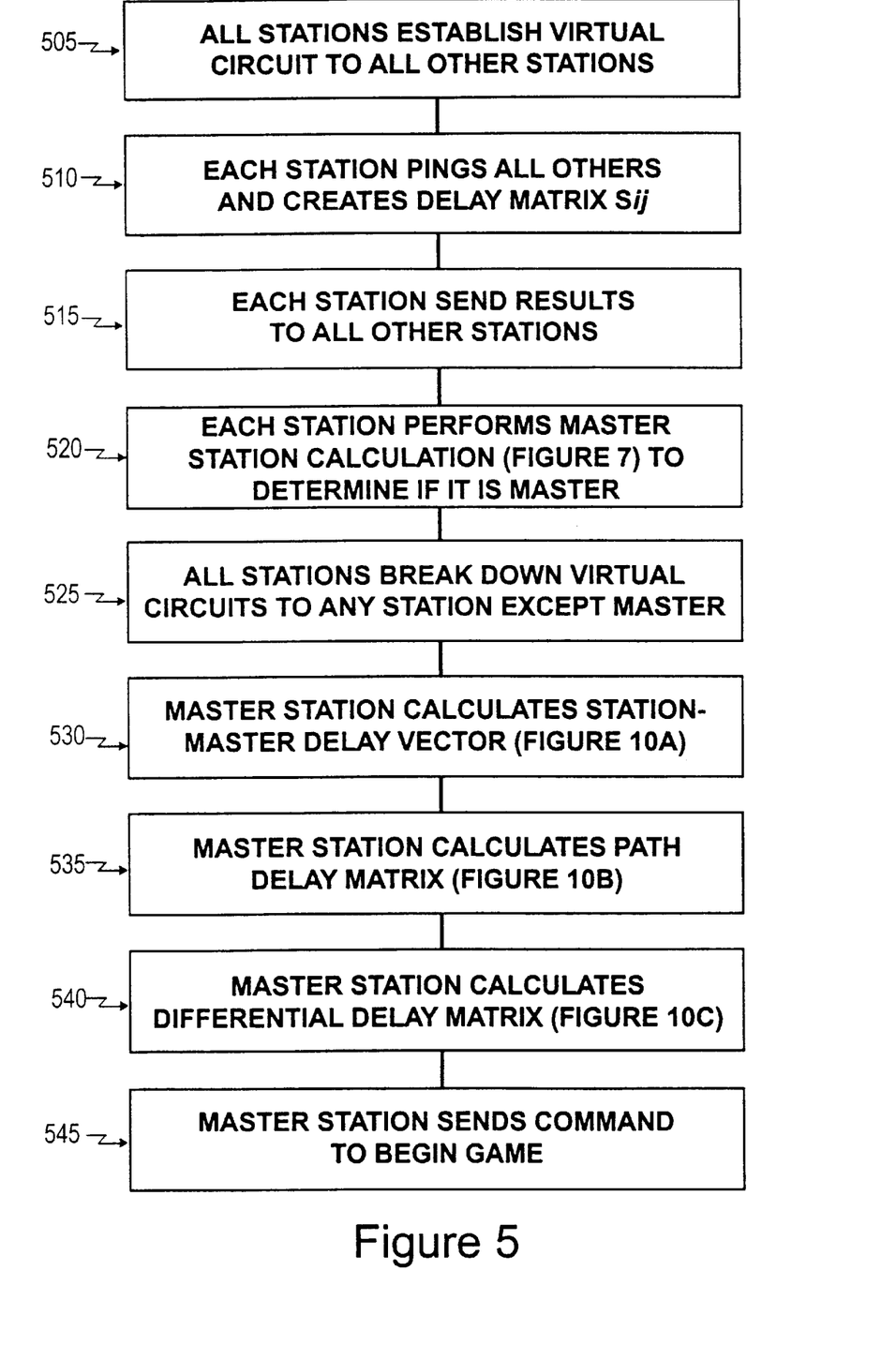
FIG. 5 is a flow chart illustrating the hand shaking process of software illustrated in FIG. 4.

FIG. 5 is a high level flow chart of the handshaking implemented according to the invention. At the beginning of the handshaking, each station establishes a virtual circuit connection to all other stations participating in the game (505).

Each station pings all of the others, that is, each measures a round trip delay time to each other station participating in the game by sending a timing signal (e.g. a packet) while simultaneously starting a timer. Each station receiving the signal echoes back that signal to the station of origin. When the echoed signal is received at the station of origin, the timer is stopped and the duration indicated by the timer is considered to be the round trip delayed time for the link between the station and the station from which the signal was echoed.

Each station then sends the echoed results to all other stations (515). Upon receipt of all pinging information, each station creates a delay matrix $S_{ij}$ representing the station to station delay and performs the master station determination illustrated in FIG. 7 to determine if it is a master station (520). Once each station knows which station is the master station, all stations may optionally break down the virtual circuits to any station except the master station (525).

Figure 10A:
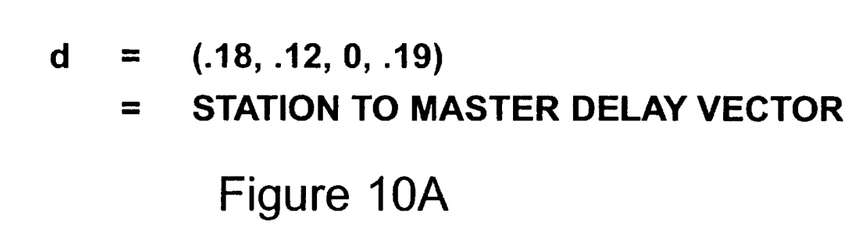
FIG. 10A illustrates a station to master delay vector.

The master station calculates a station-master delay vector by selecting the column j of the matrix $S_{ij}$ which corresponds to the master station (530 — See FIG. 10A.

Figure 10B:
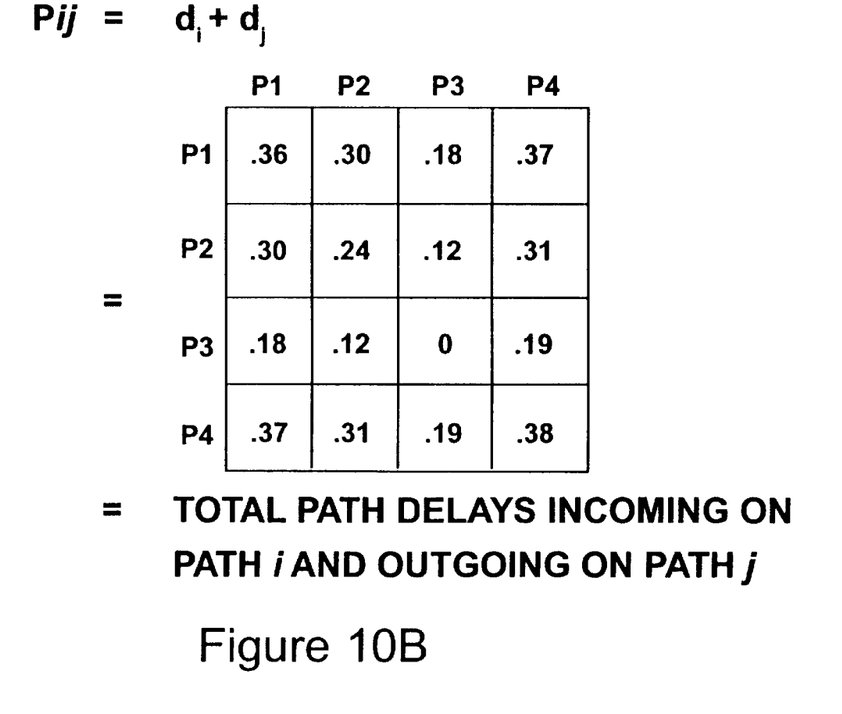
FIG. 10B illustrates a total path delay matrix $P_{ij}$.
Figure 10C:
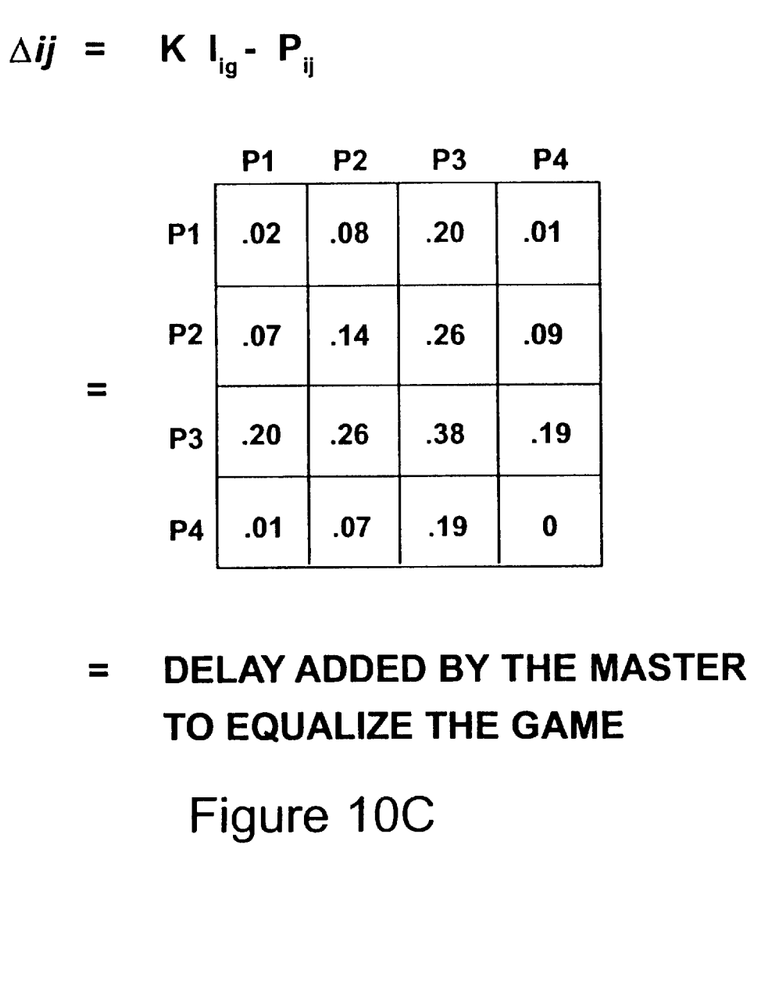
FIG. 10C illustrates a differential delay matrix $\Delta_{ij}$.

The master station then calculates the path delay matrix as shown in FIG. 10B. From the path delay matrix, the master station calculates a station differential delay matrix as shown in FIG. 10C (540). Once the differential delay matrix is calculated, the master station knows by how much to delay each packet from an incoming station i to a destination station j and the game is ready to begin (545). The use of the differential delay matrix will be described in greater detail hereinafter.

Figure 6:
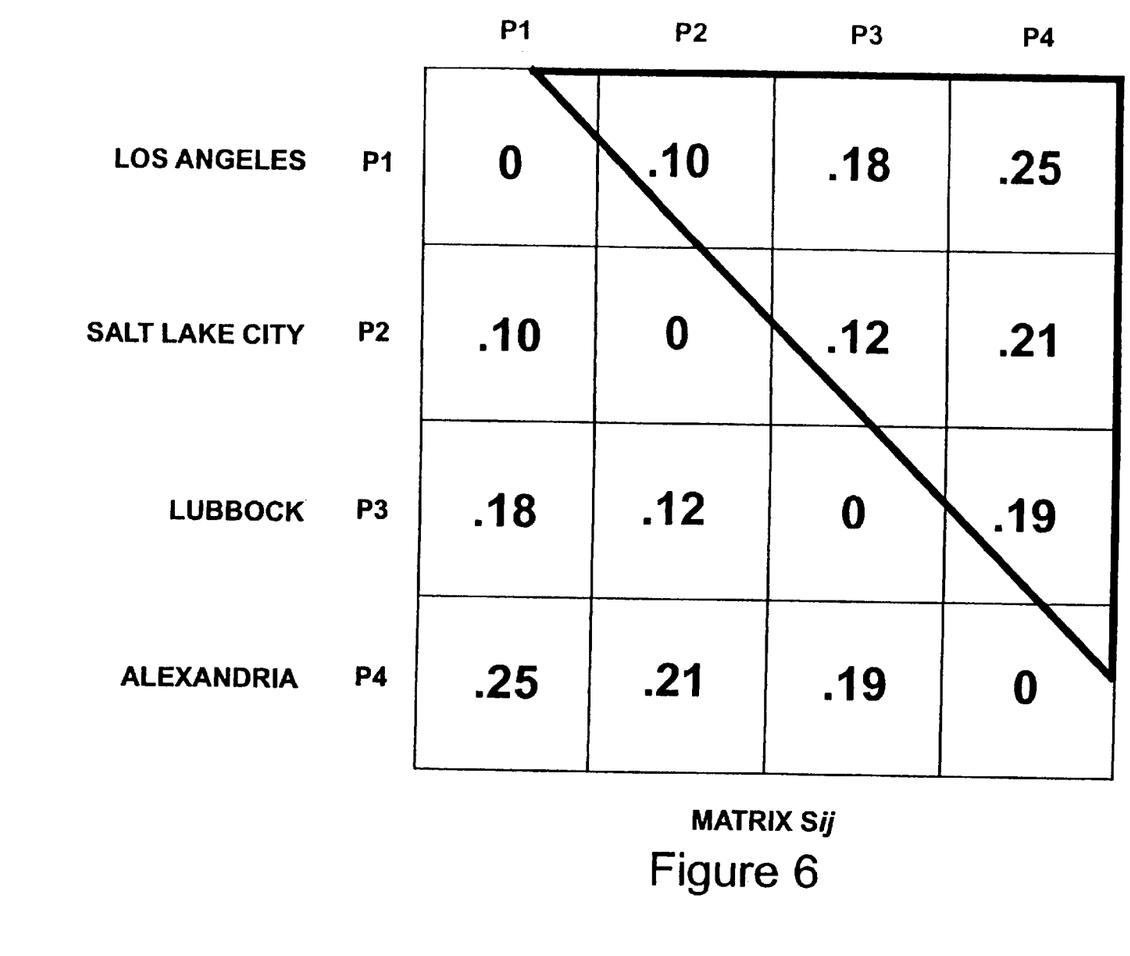
FIG. 6 illustrates a path delay matrix showing exemplary delays incurred over a communications network between the various cities illustrated in FIG. 2.

FIG. 6 illustrates the result of the handshaking process described with reference to FIG. 5. This matrix represents the round trip delay times experienced by the various station pairs participating in the game. The delay between Los Angeles station P1 and itself is 0, the delay between P1 and Salt Lake City station P2 is 0.10 second. The delay between P1 and Lubbock station P3 is 0.18 second. The delay between P1 and Alexandria station P4 is 0.25 second, and so on.

Although matrix $S_{ij}$ is shown as symmetrical, symmetry is not necessary. That is, the delay between station P2 and P3 may not necessarily be the same as the delay between station P3 and P2.

Figure 7:
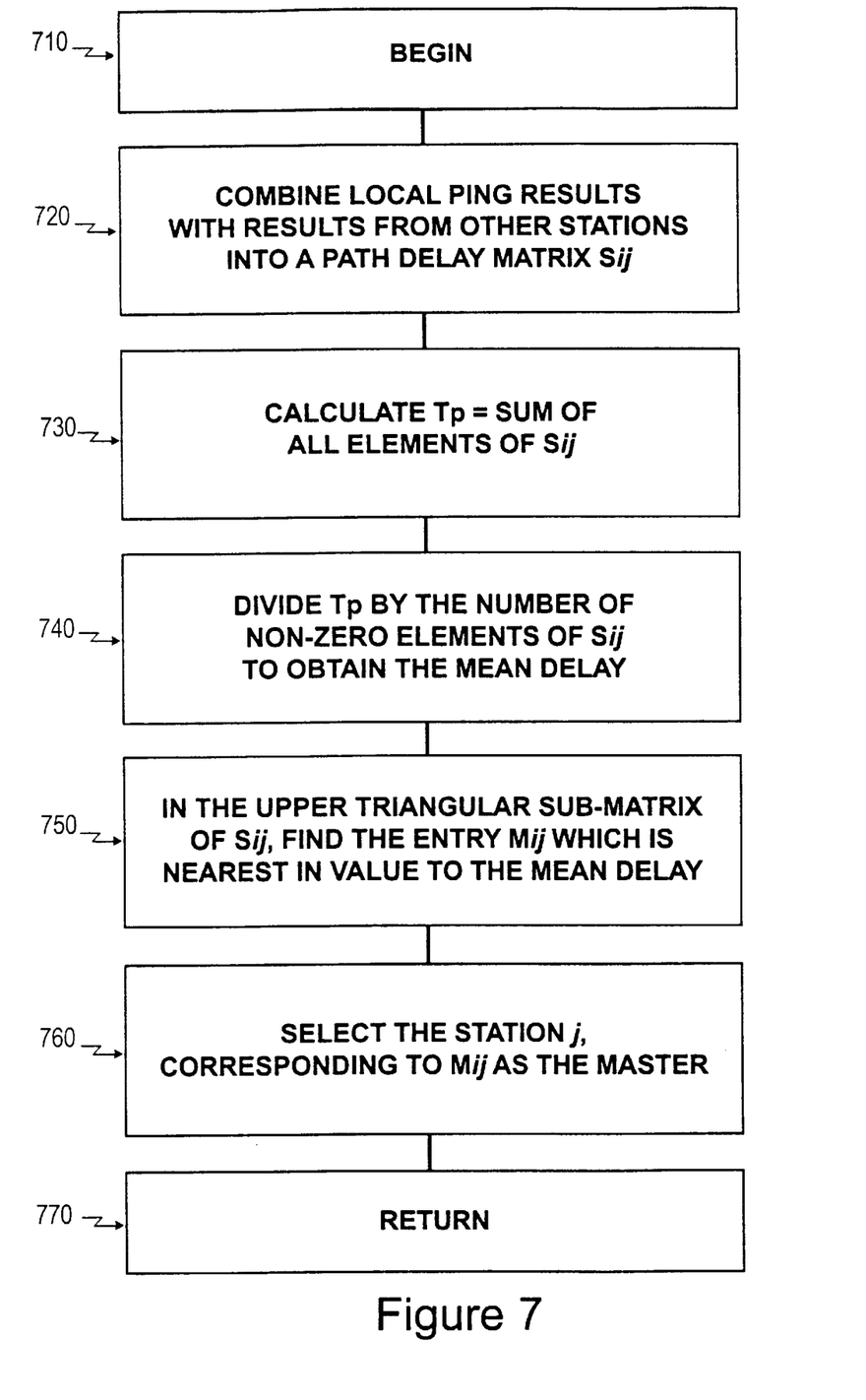
FIG. 7 is a flow chart of the calculations required to determine which station will be the master station for the game.

FIG. 7 is a flow chart of the steps necessary to determine which station will be the master station for the game. This Figure sets forth in detail that which was described generally with respect to block 520 of FIG. 5.

The calculation of master status begins (710) by combining the local ping results with information from other stations into a path delay matrix $S_{ij}$ (720). All of the elements of path delay matrix $S_{ij}$ are summed (730) and the sum is divided by the number of non-zero elements of $S_{ij}$ to calculate a mean delay for the matrix (740).

An upper triangular sub-matrix of matrix of $S_{ij}$ is defined as all the non-diagonal elements of the matrix which are above the diagonal. These elements are shown enclosed within a triangle in FIG. 6. In the upper triangular sub-matrix of $S_{ij}$, one finds the entry $m_{ij}$ which is nearest in value to the mean delay $T_p$. The station, j, corresponding to $m_{ij}$ is designated as the master station (760) and the initialization sequence continues (770).

Figure 8:
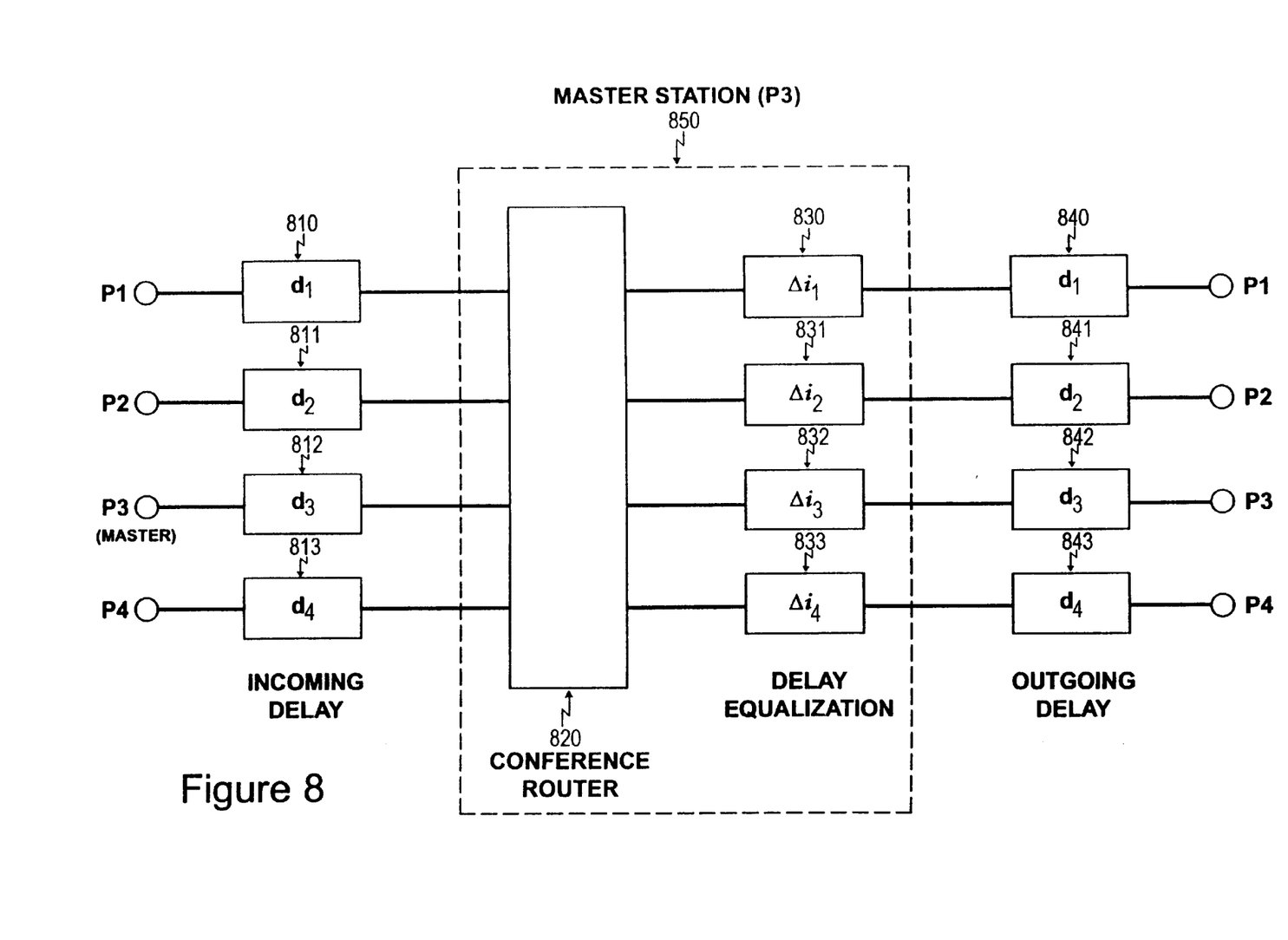
FIG. 8 illustrates functionally the various delay relationships among the stations during operation of a game.

FIG. 8 illustrates, functionally, what happens within the master station during the operation of a game. Packets are sent from stations P1–P4 and arrive at master station 850 after respective network delays 810 through 813. For illustration purposes, station P3 is assumed to be the master in keeping with the example previously developed. Since P3 is the master, there is no network delay associated with that and the value D3 indicated at item 812 and correspondingly on the output side at 842 is substantially 0. Conference router 820 receives incoming packets from a station $P_i$ replicates the packet four times in the illustration, one for each station, and outputs it to respective sets of delay elements $\Delta_{ij}$ through $\Delta_{i4}$ (830–833). Each delay element 830–833 represents the fact that individual delays are applied to a packet depending on its origin (P1–P4) and its destination. That is, a packet arriving from P1 and going to P3 will be delayed in delay element 833 by an amount $\Delta_{13}$ whereas a packet arriving from P4 and destined for P3 will be delayed by an amount $\Delta_{43}$ as illustrated in the differential delay matrix shown in FIG. 10C. Essentially the conference router routes all incoming commands from station i to all stations with the appropriate amount of delay. All stations have the capability of functioning as a master station; however, during a game, those functions are active only at the designated master station for that game.

Figure 9:
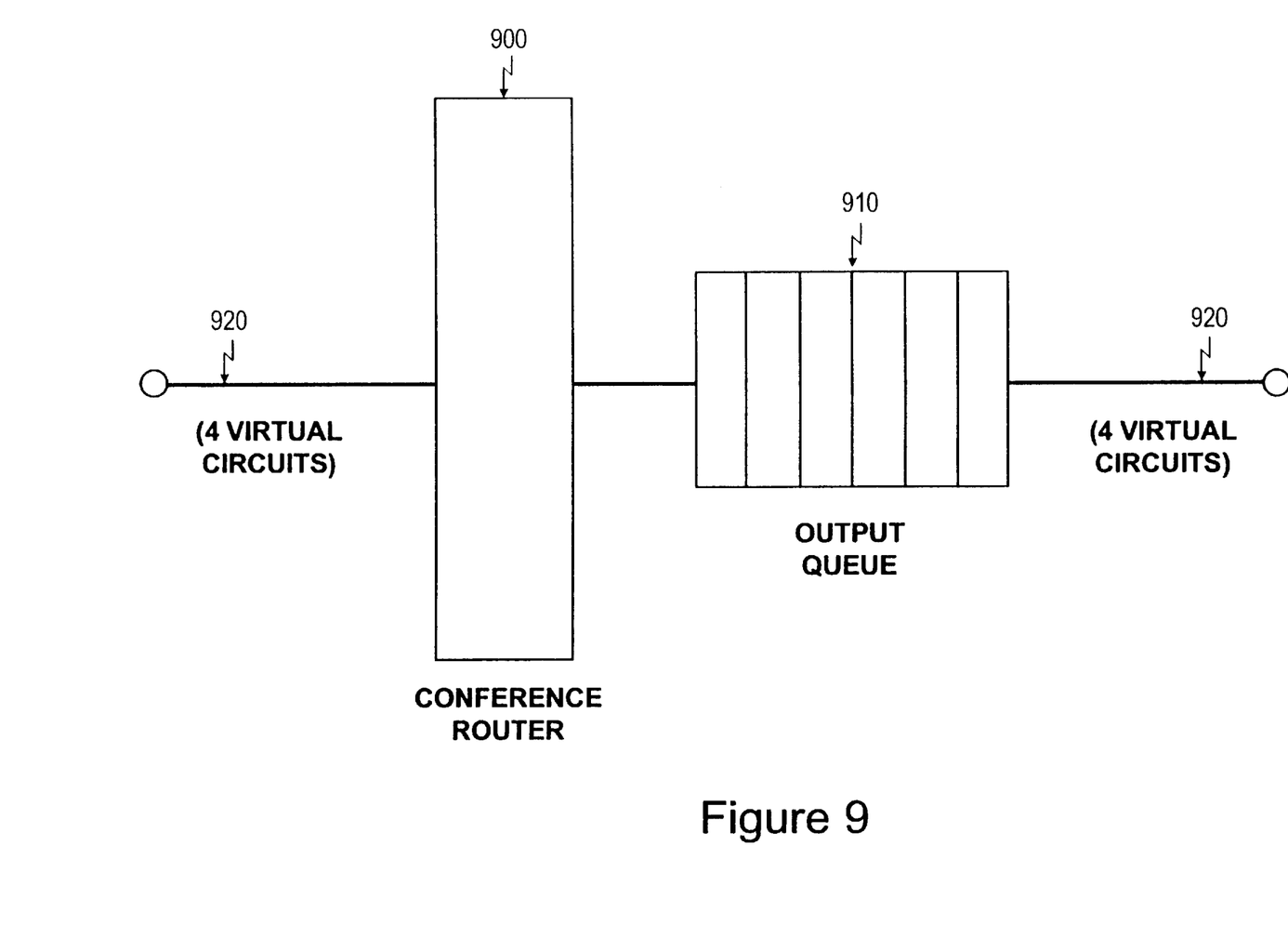
FIG. 9 illustrates an implementation of the functionality illustrated in FIG. 8.

FIG. 9 illustrates an implementation of the functionality described in FIG. 8. As a practical matter, there is only one communication line going to and leaving from a station (920). However, that line services four virtual circuits in this example. Conference router 900 identifies the source of an incoming packet, replicates it and places it in output queue 910 at a location and with an execution time designation which will ensure that the packet is sent at a time which will equalize delay to all game players. The determination of how to equalize that delay is shown in Fig. 10A through 10C.

FIG. 10A shows the station to master delay vector d, with elements d1, d2, d3 and d4. This vector represents essentially column P3 of station delay matrix $S_{ij}$ of FIG. 6.

FIG. 10(B) illustrates total path delay matrix $P_{ij}$ which is derived from the components of the station to master delay vector of FIG. 10A. Matrix element $P_{ij}=d_i+d_j$. The values shown in FIG. 10B are derived using the Figures from matrix $S_{ij}$ of FIG. 6.

FIG. 10 (C) shows the differential delay matrix $\Delta_{ij}$ which represents the delay added by the master station to equalize the game. Specifically, element $\Delta_{ij}$ represents the amount of delay added by the master station to a packet received from station i and destined for station j. These delays were represented functionally in FIG. 8 by delay elements 830–833. The value of $\Delta_{ij}$ is calculated by subtracting the maximum value of matrix $P_{ij}$, which intuitively corresponds to the worst case round trip delay time, and subtracting the individual elements $P_{ij}$ to give the differential delay matrix $\Delta_{ij}$. Thus, $P_{44}$ in matrix $P_{ij}$ represents the worst case round trip delay time. That number is subtracted from each of the elements in matrix $P_{ij}$ to give the differential delays to be added by the master station to equalize the game.

Figure 11:
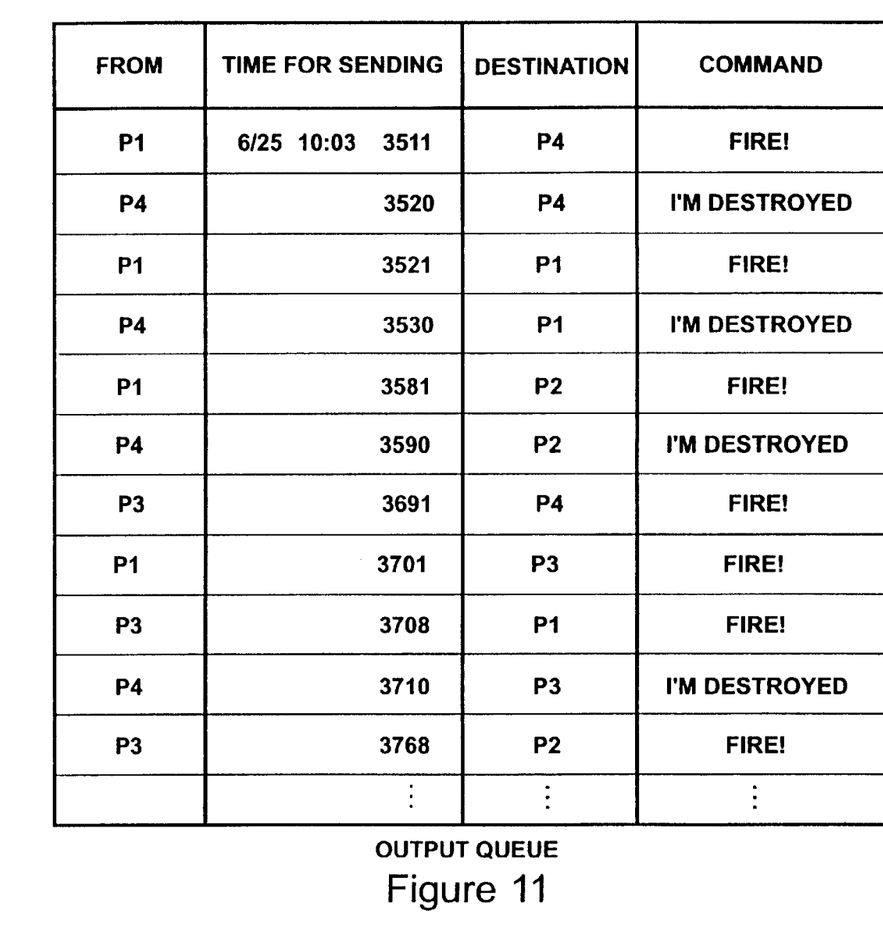
FIG. 11 illustrates typical data contained in an output queue of the implementation of FIG. 1.

FIG. 11 illustrates an example of the contents of the output queue 910 shown in FIG. 9 under the following conditions. Assume that station P1 issues a "FIRE!" command which is received at the master station on Jun. 25, 1994, at 10:03 a.m. plus 3,501 msec. This will result in four queue entries, one for each of the stations with respective time offsets of 3,521 msec (P1), 3,581 msec (P2), 3,701 msec (P3), and 3,511 msec (P4).

Next, P3 issues a "FIRE!" command which is received at the master station at 10:03 a.m. plus 3,508 msec. This also results in four queue entries at offsets of 3,708 msec. (P1), 3,768 msec (P2), 4,308 msec (P3), and 3,691 msec (P4).

Station P4 then issues an "I AM DESTROYED" command received at 10:03 a.m. plus 3,520 msec. This results in four queue entries at time offsets 3,530 msec (P1), 3,590 msec (P2), 3,710 msec (P3) and 3,520 msec (P4).

By application of the differential delay table shown in FIG. 10(C), the three individual commands from P1, P3 and P4 respectively result in twelve output packets transmitted to the stations participating in the game. Queue management at the master station organizes the packets generated by the conference router into the output queue in an order determined by the transmit times calculated by the use of the differential delay matrix. Thus, although the packet from P4 arrives 19 msec. after the packet from P1 in a hypothetical example, the packet P4 was sent to station P4 for action before many of the packets spawned by later arriving packets. The reason for this is as follows. Because P4 is located farthest from the master station, its packets must be sent earlier than the corresponding packets replicated for sending to stations P1–P3; it will take longer for the packet to get to P4. The object of the queuing is to ensure commands reach all stations substantially simultaneously.

There has, thus, been described method and apparatus for carrying out multi-player gaming over a network and ways which will permit multiple players to participate through only one access port to the network. Delay penalties which might be experienced by distant stations all at the same time are eliminated, making the game fair to all players.

In this disclosure, there is shown and described only the preferred embodiment of the invention but, as aforementioned, it is to be understood that the invention is capable of use in various other combinations and environments and is capable of changes or modifications within the scope of the inventive concept as expressed herein.

I claim:

1. A gaming apparatus in which each player is interconnected with plural other players over a communications network, comprising at each player's location:
   (a) means for measuring round trip delay times required to communicate between players over said network, respectively;
   (b) means for determining which player will serve as a master station based on said round trip delay times; and
   (c) means for equalizing communication delays so that any command sent by any player to the master station is transmitted to all players and received at all player locations substantially simultaneously.

2. The apparatus of claim 1 in which the network is a digital network.

3. The apparatus of claim 2 in which the network is an X.25 digital network.

4. The apparatus of claim 2 including dial up communication links interconnecting the players to the network.

5. The apparatus of claim 2 in which the network establishes virtual circuits between players.

6. The apparatus of claim 1 in which the means for measuring the round trip delay times required for any player to communicate with each other player over said network includes
   (a) means for sending a timing signal from a player to each other player and for receiving back from said other player an echoed version of said timing signal, and
   (b) means for calculating differences between a time when each timing signal is sent and times corresponding echoed versions of the timing signal are received back.

7. The apparatus of claim 6 in which the timing signal is a digital packet.

8. The apparatus of claim 1 in which the means for measuring the round trip delay times required to communicate between a player and each other player over said network includes
   (a) means for sending a plurality of timing signals from each player to each other player and for receiving back from said each other player an echoed version of each said timing signal,
   (b) means for calculating a difference between a time when each timing signal is sent and a time an echoed version of the timing signal is received back, and
   (c) means for averaging calculated differences to obtain an average value for measured round trip delays.

9. The apparatus of claim 1 in which the means for determining which player will serve as a master station based on said round trip delay times comprises:
   (a) means for calculating an average delay time from measured delay times between pairs of players, and
   (b) means for designating as a master station a player with a delay value closest matching the average delay time.

10. The apparatus of claim 9 in which the average delay time is calculated from a matrix of delay times.

11. The apparatus of claim 10 in which the matrix is upper triangular or lower triangular.

12. The apparatus of claim 10, in which the matrix is symmetrical.

13. The apparatus of claim 1, in which the means for equalizing communication delays comprises at the master station:
   (a) means for receiving a game command; and
   (b) means for sending said command to each player delayed by an amount inversely proportional to an amount of measured delay between the master station and the player to which the command is sent.

14. The apparatus of claim 13, further comprising:
   (a) means for periodically redetermining round trip delay between the master station and each other player and updating an amount by which commands are delayed prior to being sent to players to reflect most recent measured values.

15. The apparatus of claim 1, further comprising means for receiving game commands only from the master station for execution by a player's game software.

16. A method of gaming in which each player is interconnected with plural other players over a communications network, comprising at each players location:
   (a) measuring the round trip delay times required to communicate between a local player and each other player over said network, respectively;
   (b) determining which player will serve as a master station based on said round trip delay times; and
   (c) equalizing communication delays so that each command sent by any player to the master station is transmitted to all players and received at all player locations substantially simultaneously.

17. A method of operating a communication network to permit gaming by a plurality of players connected to the network, comprising:
   (a) designating a player to act as a master station based on measured round trip communication delay times experienced between pairs of players;
   (b) routing all game commands through the master station for transmission to all players; and
   (c) equalizing the delays experienced by game commands received at the master station so that each command will be received at all player locations substantially simultaneously.

* * * * *